US012810062B2

(12) United States Patent
Tamayo

(10) Patent No.: US 12,810,062 B2
(45) Date of Patent: Nov. 24, 2026

(54) ADAPTIVE ELECTRONIC MESSAGING BASED ON USER INTERACTION

(71) Applicant: Capital One Services, LLC, McLean, VA (US)

(72) Inventor: Bryan Tamayo, Allen, TX (US)

(73) Assignee: Capital One Services, LLC, McLean, VA (US)

( * ) Notice: Subject to any disclaimer, the term of this patent is extended or adjusted under 35 U.S.C. 154(b) by 269 days.

(21) Appl. No.: 18/435,673

(22) Filed: Feb. 7, 2024

(65) Prior Publication Data

US 2025/0252253 A1 Aug. 7, 2025

(51) Int. Cl.
*G06F 40/197* (2020.01)

(52) U.S. Cl.
CPC .................................. *G06F 40/197* (2020.01)

(58) Field of Classification Search
CPC ..................................................... G06F 40/197
See application file for complete search history.

(56) References Cited

U.S. PATENT DOCUMENTS

2016/0373396 A1* 12/2016 Sorg ........................ G06Q 10/40
2019/0121842 A1* 4/2019 Catalano ............... G06F 40/247
2020/0252470 A1* 8/2020 Gagnon-Kvale .. G06Q 10/0639
2021/0004437 A1* 1/2021 Zhang ................... G06F 40/205
2024/0202803 A1* 6/2024 Li ...................... G06Q 30/0635
2025/0061472 A1* 2/2025 Kabra ................ G06Q 30/0201

* cited by examiner

*Primary Examiner* — Asher D Kells
(74) *Attorney, Agent, or Firm* — Harrity & Harrity, LLP

(57) ABSTRACT

A system may obtain interaction information associated with a first electronic message. The interaction information may be associated with interaction of a user with the first electronic message. The system may determine, based on the interaction information, content performance information associated with a plurality of content blocks of the first electronic message. The system may generate a plurality of content block interaction metrics based on the content performance information, each content block interaction metric in the plurality of content block interaction metrics being associated with a respective content block of the plurality of content blocks. The system may generate content priority information based on the plurality of content block interaction metrics. The system may generate content adaptation information associated with the user based on the content priority information. The system may cause a second electronic message for the user to be generated based on the content adaptation information.

20 Claims, 6 Drawing Sheets

ADAPTIVE ELECTRONIC MESSAGING BASED ON USER INTERACTION

BACKGROUND

An electronic message is a digital communication that is designed or intended to be transmitted between physical devices for eventual viewing by a recipient, such as a user of a user device. An electronic message may take the form of, for example, an electronic mail (email) message, a text message, an instant message, a command or request to access a website, or other data that uses a particular communications protocol.

SUMMARY

In some implementations, a system for electronic message adaptation includes one or more memories; and one or more processors, communicatively coupled to the one or more memories, configured to: obtain interaction information associated with a first electronic message, the interaction information being associated with interaction of a user with the first electronic message; determine, based on the interaction information, content performance information associated with a plurality of content blocks of the first electronic message; generate a plurality of content block interaction metrics based on the content performance information, each content block interaction metric in the plurality of content block interaction metrics being associated with a respective content block of the plurality of content blocks; generate content priority information based on the plurality of content block interaction metrics; generate content adaptation information associated with the user based on the content priority information; and cause a second electronic message for the user to be generated based on the content adaptation information.

In some implementations, a method for electronic message adaptation includes obtaining, by a system, interaction information associated with an electronic message, the interaction information including information associated with interaction of a user with the electronic message; determining, by the system, content performance information based on the interaction information, the content performance information including information associated with performance of a plurality of content blocks of the electronic message with respect to user interaction; generating, by the system, a plurality of content block interaction metrics based on the content performance information, each content block interaction metric in the plurality of content block interaction metrics being associated with a respective content block of the plurality of content blocks; generating, by the system, content priority information based on the plurality of content block interaction metrics; and generating, by the system, content adaptation information associated with the user based on the content priority information.

In some implementations, a non-transitory computer-readable medium storing a set of instructions includes one or more instructions that, when executed by one or more processors of a system, cause the system to: obtain interaction information associated with a first electronic message provided to a user; determine, based on the interaction information, content performance information associated with a plurality of content blocks of the first electronic message; generate content priority information based on a plurality of content block interaction metrics generated based on the content performance information; generate or update content adaptation information associated with the user based on the content priority information; and provide the content adaptation information in association with modifying the first electronic message or generating a second electronic message associated with the user.

DETAILED DESCRIPTION

Figure 1A:
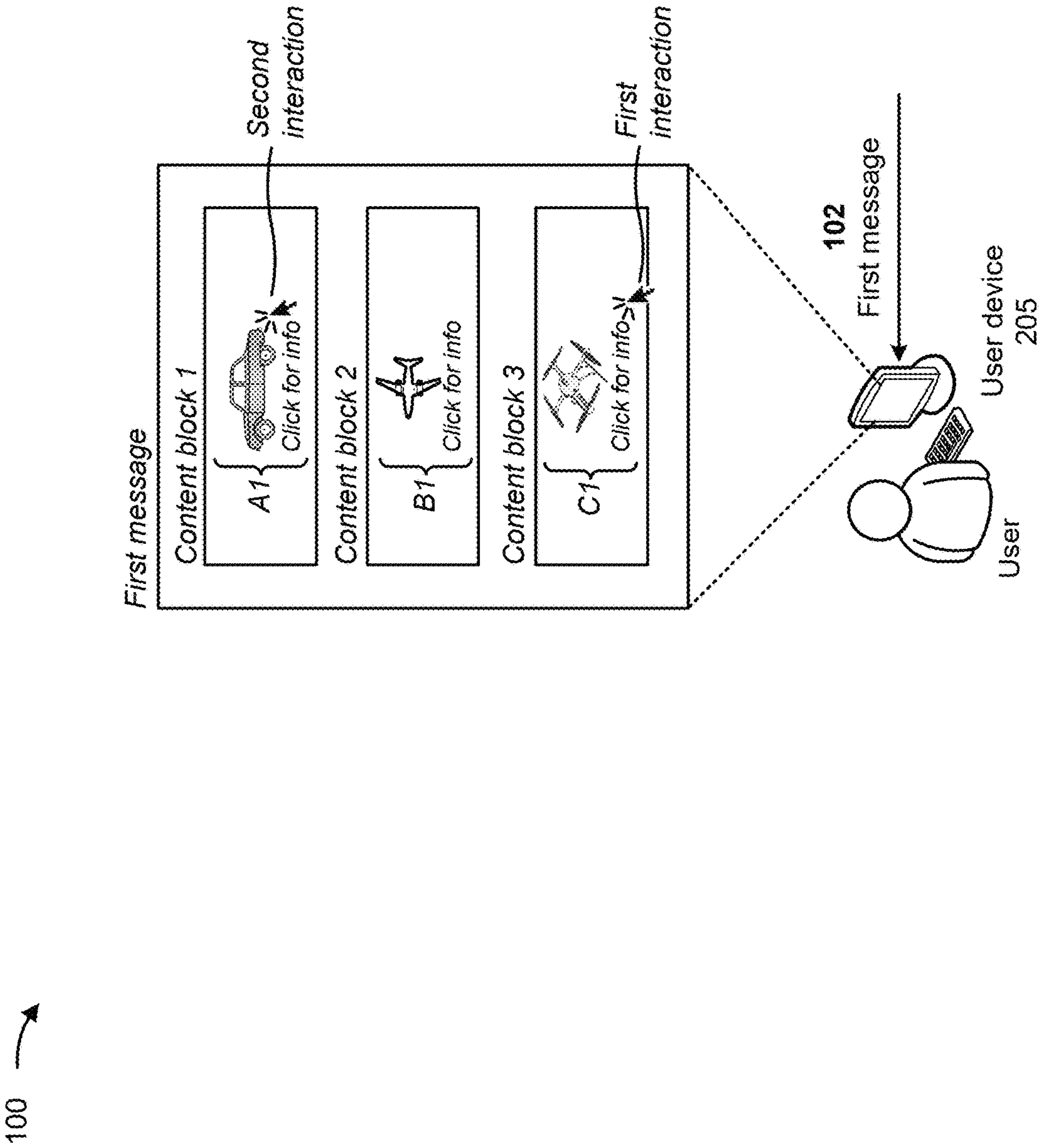
FIGS. 1A-1C are diagrams of an example associated with adaptive electronic messaging based on user interaction, in accordance with some embodiments of the present disclosure.

The following detailed description of example implementations refers to the accompanying drawings. The same reference numbers in different drawings may identify the same or similar elements.

Conventional techniques for generating an electronic message (e.g., an email) to be provided to a particular user (e.g., a marketing email) rely on metrics that do not capture performance of specific content or blocks of content in other electronic messages previously provided to the user. This limitation hinders the ability to optimize electronic message content and layout to optimize an experience of the user, as well as reduce the number of electronic messages that are provided to the user since, for example, content in a given electronic message is not tailored to the particular user. As a result, a given user may receive and view numerous emails with which there is limited user interaction, which not only degrades user experience, but is wasteful of resources of the user device (e.g., in terms of battery power, processing power, memory, or the like) and of resources of a network (e.g., radio resources, network bandwidth, processing power, memory, or the like) via which electronic messages are communicated.

Some implementations described herein enable adaptive electronic messaging based on user interaction. In some implementations, a message adaptation system may obtain interaction information associated with a message (e.g., an email) provided to a user. From this interaction information, the message adaptation system may determine content performance information associated with a plurality of content blocks of the message (e.g., an indication of how content in each block of the message "performed" with respect to interaction with the user). Next, the message adaptation system may generate content block interaction metrics based on the content performance information (e.g., a performance metric for each content block), from which the message adaptation system may generate content priority information (e.g., an indication of how content or types of content are to be prioritized for the user). The system then generates content adaptation information based on the content priority information (e.g., information that indicates how previous messages are to be adapted or how future messages are to be generated so as to adapt or generate the messages based on previous user interactions).

In some implementations, the techniques and apparatuses described herein enable evaluation of electronic message effectiveness by analyzing modular content block performance. Here, by assessing the performance of individual content blocks, insights into user engagement and preferences can be gleaned. This enables data-driven decision making to optimize electronic message content and layout, resulting in improved user engagement, conversion rates, and overall electronic message effectiveness, as well as reducing wastage of resources of a given user device (e.g., in terms of battery power, processing power, memory, or the like) and of resources of a network (e.g., radio resources, network bandwidth, processing power, memory, or the like) via which electronic messages are communicated (e.g., by reducing a number of electronic messages that may be provided to the given user device via the network).

Figure 1B:
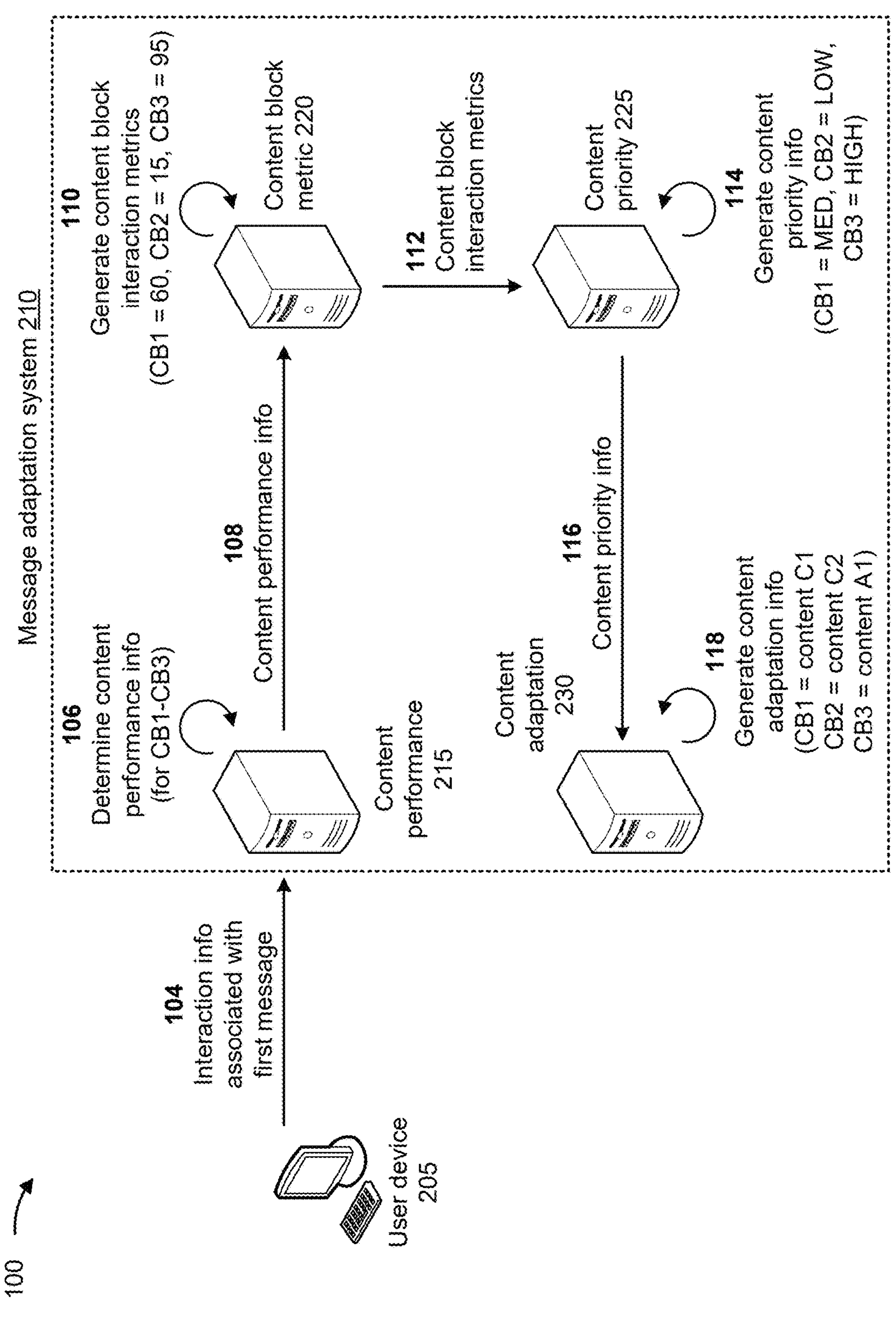
Figure 1C:
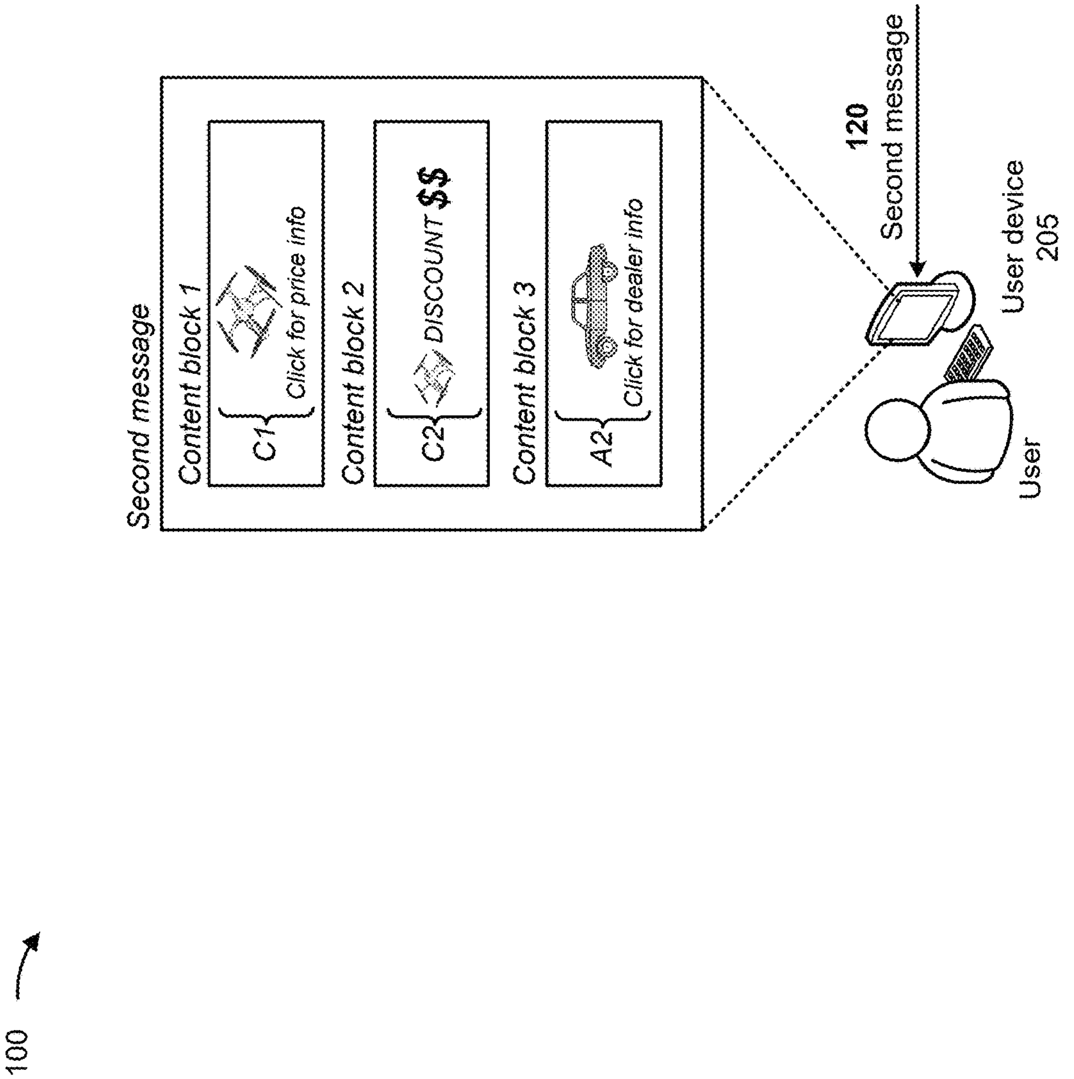

FIGS. 1A-1C are diagrams of an example 100 associated with adaptive electronic messaging based on user interaction. As shown in FIGS. 1A-1C, example 100 includes a user device 205 and a message adaptation system 210 comprising a content performance device 215, a content block metric device 220, a content priority device 225, and a content adaptation device 230. These devices are described in more detail in connection with FIGS. 2 and 3. As shown in FIG. 1A at reference 102, the user device 205 may receive a first electronic message (e.g., a first email), and may provide the first electronic message for display to a user via a display screen of the user device 205.

In some implementations, an electronic message comprises a plurality of content blocks. As used herein, a "content block" is a region or section of an electronic message in which content is provided for display or otherwise provided for viewing by the user. Content associated with a given content block of an electronic message may include, for example, one or more images, one or more videos, one or more strings of text, one or more hyperlinks, one or more infographics, one or more textboxes, one or more buttons, or one or more other types of content with which the user can interact. In the example shown in FIG. 1A, the first electronic message includes content block 1, content block 2, and content block 3. As shown, in the first electronic message, content A1 (e.g., an image of an automobile associated with a first hyperlink) is provided in content block 1, content B1 (e.g., an image of an airplane associated with a second hyperlink) is provided in content block 2, and content C1 (e.g., an image of a drone associated with a third hyperlink) is provided in content block 3.

In some implementations, the user may interact with one or more items of content included in the first electronic message. For example, as illustrated in FIG. 1A, a first (in time) interaction may be an interaction of the user with the content C1 in content block 3 (e.g., the user may click the image of the drone to open the third hyperlink with which the image is associated). In this example, a second (in time) interaction may be an interaction of the user with the content A1 in content block 1 (e.g., the user may click the image of the automobile to open the first hyperlink with which the image is associated).

In some implementations, the user device 205 may obtain interaction information associated with the first electronic message. As used herein, "interaction information" is information associated with one or more interactions of a user with an electronic message. As one example, the interaction information may include information indicating that a particular item of content (e.g., an image, a video, an audio file, or the like) has been opened, loaded, displayed, or played. As another example, the interaction information may include information indicating that a particular item of content (e.g., an image comprising a hyperlink, a hyperlink, a button, or the like) has been interacted with (e.g., clicked on or otherwise selected) by the user. As another example, the interaction information may include information provided by the user via one or more items of content (e.g., an input textbox, a content upload field, or the like). As another example, the interaction information may include information that indicates a timing of an interaction with a given item of content (e.g., a time at which the interaction occurred, a timing of an interaction with a given item of content with respect to interactions with other items of content in the electronic message). In some implementations, the user device 205 may obtain the interaction information via one or more mechanisms, such as through the use of tracking pixels embedded in the electronic message, a wrapped uniform resource locator (URL) with one or more tracking parameters, or a redirect service (e.g., to provide click tracking), among other examples.

In the example shown in FIG. 1A, the interaction information may indicate that content included in content blocks 1 through 3 was provided to display for the user. The interaction information may further indicate that the user first interacted with (e.g., clicked on) content in content block 3, after which the user interacted with content in content block 1.

As shown in FIG. 1B at reference 104, the user device 205 may provide, and the content performance device 215 may receive, the interaction information associated with the first electronic message. In some implementations, the user device 205 may provide the interaction information based on detecting a triggering event. The triggering event may include, for example, the first electronic message being closed by the user (e.g., such that the first electronic message is no longer provided for display to the user). As another example, the triggering event may be the interaction with the content (e.g., a click by the user). As another example, the triggering event may be a request from the content performance device 215. As another example, the triggering event may be an expiration of a timer (e.g., when the user device 205 is configured to provide interaction information automatically on a periodic basis).

In some implementations, the user device 205 may include information associated with the user in the interaction information. The information associated with the user may include, for example, a user identifier associated with the user. Additionally, or alternatively, the user device 205 may include information associated with the electronic message (e.g., a message identifier) in the interaction information. Thus, the interaction information may in some implementations include an indication of the user and the electronic message with which the interaction information is associated.

As shown at reference 106, the content performance device 215 may determine content performance information associated with the plurality of content blocks of the first electronic message based on the interaction information. The content performance information includes information indicative of a performance of the content blocks of an electronic message with respect to user interaction.

In some implementations, the content performance device 215 determines the content performance information by evaluating a performance of each content block based on the interaction information (e.g., data associated with user interaction with the content). Put another way, the content performance device 215 may interpret interaction information associated with a given content block to determine information indicative of performance of the given content block with respect to interaction by the user. In some implementations, to determine the content performance information, the content performance device 215 may be configured with or have access to a content performance model. The content performance model may be a model configured to process interaction information associated with a given content block to determine content performance information for the content block. In some implementations, the content performance model may be configured or trained using one or more artificial intelligence (AI) techniques. The one or more AI techniques may include, for example, machine learning, a convolutional neural network, deep learning, language processing, or the like. In this way, the content performance model enables the content performance device 215 to interpret user behaviors or preferences indicated by the interaction information in order to determine the content performance information.

In some implementations, the content performance device 215 may determine the content performance information for each content block. That is, the content performance device 215 may determine content performance information in a modular fashion such that content performance information is separately determined for each content block in the plurality of content blocks. For example, with respect to example 100, the content performance device 215 may determine content performance information comprising information indicative of performance of content block 1 of the first electronic message (e.g., performance information associated with content A1), information indicative of performance of content block 2 of the first electronic message (e.g., performance information associated with content B1), and information indicative of performance of content block 3 of the first electronic message (e.g., performance information associated with content C1).

In some implementations, the content performance device 215 may include information associated with the user in the content performance information. The information associated with the user may include, for example, a user identifier associated with the user. Additionally, or alternatively, the content performance device 215 may include information associated with the electronic message (e.g., a message identifier) in the content performance information. That is, the content performance information may include an indication of the user and/or the electronic message with which the content performance information is associated.

As shown at reference 108, the content performance device 215 may provide, and the content block metric device 220 may receive, the content performance information. In some implementations, the content performance device 215 may (automatically) provide the content performance information upon determining the content performance information.

As shown at reference 110, the content block metric device 220 may generate a plurality of content block interaction metrics based on the content performance information. Here, each content block interaction metric in the plurality of content block interaction metrics may be associated with a respective content block of the plurality of content blocks. A content block interaction metric is a metric based on which a performance of a content block of an electronic message can be evaluated. In some implementations, the evaluation enabled by the content block interaction metric for a given content block may be a comparative analysis in which a content block interaction metric associated with a given content block is compared to that of one or more other content blocks. Additionally, or alternatively, the evaluation enabled by the content block interaction metric for a given content block may be a threshold analysis in which a content block interaction metric associated with a given content block is compared to a threshold. In some implementations, a content block interaction metric may be, for example, a numerical value (e.g., a value from 0 to 100, a value from 0.0 to 1.0, or the like), a grade (e.g., a letter grade from A to F), or another type of metric indicative of performance of the content block with respect to user interaction. In this way, the content block interaction metrics associated with the plurality of content blocks enable identification of comparatively higher performing content blocks and comparatively lower performing content blocks.

In some implementations, the content block metric device 220 may generate the plurality of content block interaction metrics using a content block interaction metric model stored or accessible by the content block metric device 220. In some implementations, the content block metric model may be a model trained or otherwise configured to receive content performance information as input and to provide a content block interaction metric as output. In some implementations, the content block interaction metric model may be configured or trained using one or more AI techniques (e.g., machine learning, a convolutional neural network, deep learning, language processing, or the like).

In the example shown in FIG. 1B, the content block metric device 220 generates (e.g., using a content block interaction metric model accessible by the content block metric device 220) a plurality of content block interaction metrics including a content block interaction metric of 60 for content block 1 of the first electronic message, a content block interaction metric of 15 for content block 2 of the first electronic message, and a content block interaction metric of 95 for content block 3 of the first electronic message.

In some implementations, the content block metric device 220 may include information associated with the user in the plurality of content block interaction metrics. The information associated with the user may include, for example, a user identifier associated with the user. Additionally, or alternatively, the content block metric device 220 may include information associated with the electronic message (e.g., a message identifier) in the plurality of content block interaction metrics. That is, the plurality of content block interaction metrics may include an indication of the user and/or the electronic message with which the plurality of content block interaction metrics is associated.

As shown at reference 112, the content block metric device 220 may provide, and the content priority device 225 may receive, the plurality of content block interaction metrics. In some implementations, the content block metric device 220 may (automatically) provide the plurality of content block interaction metrics upon generating the plurality of content block interaction metrics.

As shown at reference 114, the content priority device 225 may generate content priority information based on the plurality of content block interaction metrics. The content priority information includes information associated with prioritization of content to be provided to the user. That is, the content priority information may indicate a prioritization of content for the user, with the prioritization being based on the plurality of interaction scores.

In some implementations, the content priority device 225 may generate the content priority information based on a determination of whether a content block interaction metric associated with a given content block satisfies (e.g., is greater than or equal to) one or more thresholds. For example, the content priority device 225 may identify a content block for which a content block interaction score satisfies (e.g., is greater than or equal to) a high priority threshold. Here, the content priority device 225 may generate the content priority information to include an indication that content related to the identified content block is high priority content. As another example, the content priority device 225 may identify a content block for which a content block interaction score fails to satisfy (e.g., is less than) a low priority threshold. Here, the content priority device 225 may generate the content priority information to include an indication that content related to the identified content block is low priority content. As another example, the content priority device 225 may identify a content block for which a content block interaction satisfies the low priority threshold, but fails to satisfy the high priority threshold. Here, the content priority device 225 may generate the content priority information to include an indication that content related to the identified content block is medium priority content. Notably, in this example, content is prioritized with respect to pre-defined priority levels (e.g., high, medium, low).

Additionally, or alternatively, the content performance device 215 may generate the content priority information such that prioritization of given content is with respect to other content (e.g., rather than with respect to pre-defined priority levels). In some implementations, the content performance device 215 may generate such content priority information based on, for example, comparing the plurality of content block interaction metrics to one another and ordering content priorities accordingly (e.g., such that content associated with a highest content block interaction metric has a highest priority, content associated with a next highest content block interaction metric has a second highest priority, and so on).

In some implementations, to determine the content priority information, the content priority device 225 may be configured with or have access to a content prioritization model. The content prioritization model may be a model configured to process content block interaction metrics associated with a given electronic message to determine content priority information. In some implementations, the content prioritization model may be configured or trained using one or more AI techniques.

In the example shown in FIG. 1B, the content priority device 225 generates (e.g., using a content prioritization model accessible by the content priority device 225) content priority information indicating that content related to the content provided in content block 1 of the first electronic message is medium priority content, that content related to the content provided in content block 2 of the first electronic message is low priority content, and that content related to the content provided in content block 3 of the first electronic message is high priority content.

In some implementations, the content priority device 225 may include information associated with the user in the content priority information. The information associated with the user may include, for example, a user identifier associated with the user. Additionally, or alternatively, the content priority device 225 may include information associated with the electronic message (e.g., a message identifier) in the content priority information. That is, the content priority information may include an indication of the user and/or the electronic message with which the content priority information is associated.

As shown at reference 116, the content priority device 225 may provide, and the content adaptation device 230 may receive, the content priority information. In some implementations, the content priority device 225 may (automatically) provide the content priority information upon determining the content priority information.

As shown at reference 118, the content adaptation device 230 may generate content adaptation information associated with the user based on the content priority information. Content adaptation information includes information based on which one or more electronic messages associated with the user are to be generated, modified, or otherwise created such that the electronic messages reflect content prioritization determined for the user (e.g., as indicated by the content priority information). In some implementations, the content adaptation device 230 may generate the content adaptation information based on the content priority information.

As one example, the content adaptation information may include an indication that content associated with a particular content block of the plurality of content blocks is not to be included in further electronic messages provided to the user. Such a scenario may occur when, for example, the content associated with the particular content block is indicated in the content priority information as low priority content. As another example, the content adaptation information may include an indication that additional content related to content associated with a particular content block of the plurality of content blocks is to be included in further electronic messages provided to the user. Such a scenario may occur when, for example, the content associated with the particular content block is indicated in the content priority information as high priority content. As another example, the content adaptation information may include an indication that content associated with two or more content blocks of the plurality of content blocks is to be reordered in further electronic messages provided to the user (e.g., such that comparatively higher priority content is displayed above comparatively lower priority in another electronic message provided to the user).

In some implementations, the content adaptation device 230 may generate the content adaptation information using a content adaptation model stored or accessible by the content adaptation device 230. In some implementations, the content adaptation model may be a model trained or otherwise configured to receive content priority information associated with a user as input and to provide content adaptation information as output. In some implementations, the content adaptation model may be configured or trained using one or more AI techniques (e.g., machine learning, a convolutional neural network, deep learning, language processing, or the like).

In some implementations, the content adaptation device 230 may store the content adaptation information associated with the user such that the content adaptation information associated with the user may be accessed and/or updated at a later time. For example, the content adaptation device 230 may (at a later time) receive content priority information associated with a second electronic message provided to the user, and may update the content adaptation information (i.e., generate updated content adaptation information) associated with the user based on the content priority information associated with the second electronic message (e.g., to reflect reprioritized content based on further interactions of the user with particular items of content). In such a case, the message adaptation system 210 may obtain second interaction information associated with the second electronic message, determine second content performance information associated with a plurality of content blocks of the second electronic message, generate a second plurality of content block interaction scores based on the second content performance information, and generate the second content priority information based on the second plurality of content block interaction scores, in a manner similar to that described above. In this way, content adaptation information associated with the user can be updated over time to better-reflect user interaction with content and/or to take into account changes in user behavior with respect to content interaction.

In the example shown in FIG. 1B, the content adaptation information indicates that content to be included in another electronic message provided for display to the user is to include content C1 (e.g., the content that was displayed in content block 3 in the first electronic message) in content block 1, content C2 (e.g., content related to the content that was displayed in content block 3 in the first electronic message) in content block 2, and content A2 (e.g., content related to the content that was displayed in content block 1 in the first electronic message) in content block 3. In this example, the content adaptation information (implicitly) indicates that content that was included in content block 2 in the first electronic message (e.g., content B1) is not to be included in (e.g., is to be omitted from) the further electronic messages provided to the user.

In some implementations, the message adaptation system 210 (e.g., the content adaptation device 230) may provide the content adaptation information associated with the user. In some implementations, the message adaptation system 210 provides the content adaptation information so as to cause another (additional) electronic message to be generated (e.g., by an electronic message server, not shown) based on the content adaptation information. For example, in some implementations, as shown by reference 120 in FIG. 1C, the message adaptation system 210 may provide the content adaptation information in order to cause a second electronic message for the user to be generated based on the content adaptation information and to be provided to the user. In this example, in accordance with the content adaptation information, the second electronic message, content C1 (e.g., the image of the drone associated with the third hyperlink that was provided in content block 3 in the first electronic message) is provided in content block 1, content C2 (e.g., another image of a drone and an associated fourth hyperlink for a discount on the drone) is provided in content block 2, and content A2 (e.g., the image of the automobile that was provided in content block 1 of the first electronic message, and an associated fifth hyperlink for an automobile dealer) is provided in content block 3. In this way, the second electronic message may be generated so as to adapt to user interactions associated with the first electronic message.

Additionally, or alternatively, the message adaptation system 210 provides the content adaptation information so as to cause the first electronic message to be modified based on the content adaptation information. That is, the content adaptation information may in some implementations be provided (e.g., to the user device 205, to an electronic message server, or the like) so as to cause the first electronic message, upon reopening by the user, to be modified based on the content adaptation information (e.g., such that the first electronic message, upon reopening, is similar to the second electronic message illustrated in FIG. 1C).

In some implementations, the message adaptation system 210 enables evaluation of electronic message effectiveness by analyzing modular content block performance. Here, by assessing the performance of individual content blocks, insights into user engagement and preferences can be determined, meaning that data-driven decision making to optimize electronic message content and layout is enabled, thereby resulting in improved user engagement, conversion rates, and overall electronic message effectiveness, as well as reducing wastage of resources of a given user device 205 (e.g., in terms of battery power, processing power, memory, or the like) and of resources of a network 235 (e.g., radio resources, network bandwidth, processing power, memory, or the like) via which electronic messages are communicated (e.g., by reducing a number of electronic messages that may be provided to the given user device 205 via the network).

In some implementations, the message adaptation system 210 can enable A/B testing and experimentation (e.g., a testing or experimentation process wherein two or more versions of an electronic message are shown to different users to determine which version has better performance with respect to user interaction). For example, the message adaptation system 210 may be utilized to conduct A/B tests and experiments with different variations of modular content blocks and/or with different content in different modular content blocks. This enables identification of effective content configurations and facilitates further refinement of electronic message layouts and content, which can further serve to improve user experience and reduce resource wastage.

As indicated above, FIGS. 1A-1C are provided as an example. Other examples may differ from what is described with regard to FIGS. 1A-1C.

Figure 2:
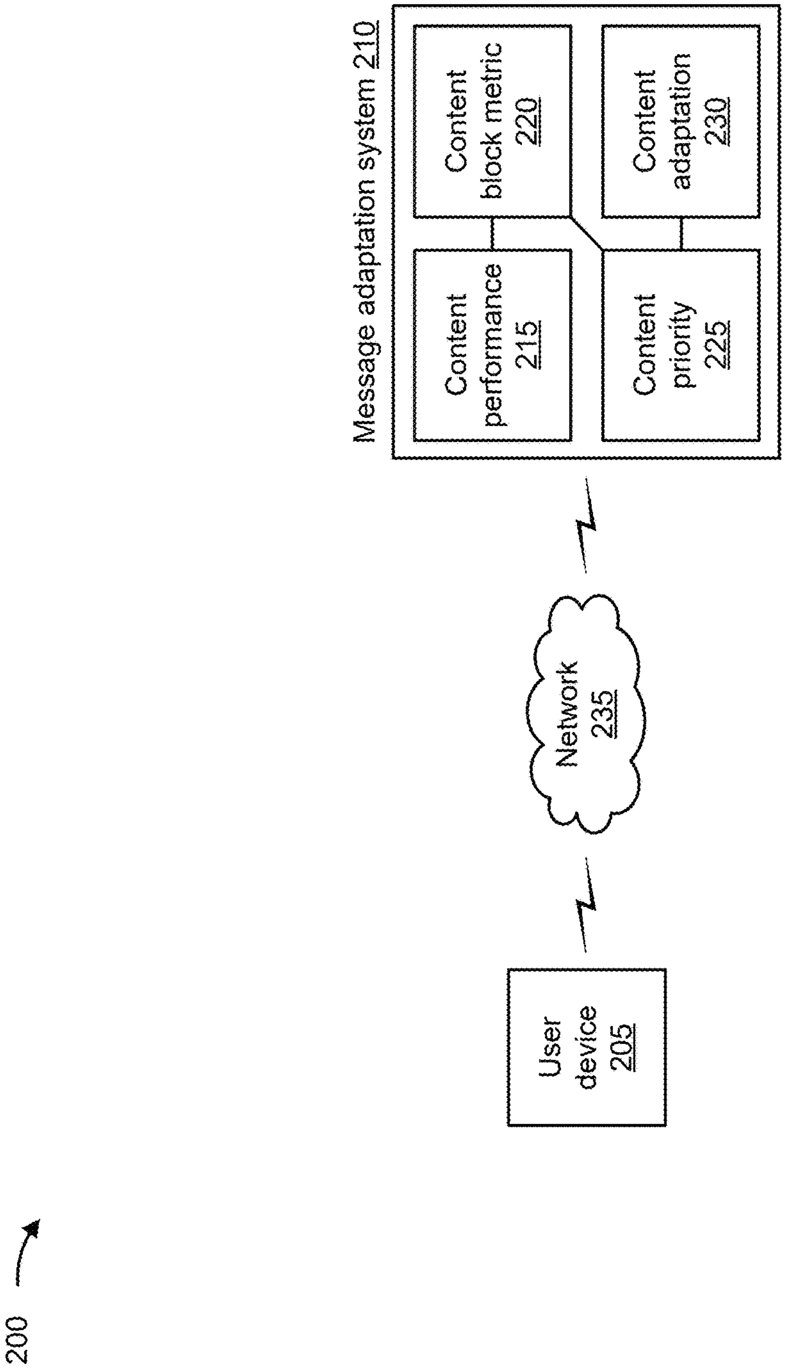
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a user device 205, a message adaptation system 210—including a content performance device 215, a content block metric device 220, a content priority device 225, and a content adaptation device 230—and a network 235. Devices of environment 200 may interconnect via wired connections, wireless connections, or a combination of wired and wireless connections.

The user device 205 may include one or more devices capable of receiving, generating, storing, processing, and/or providing information associated with adaptive electronic messaging based on user interaction, as described elsewhere herein. The user device 205 may include a communication device and/or a computing device. For example, the user device 205 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The message adaptation system 210 includes one or more devices capable of receiving, generating, storing, processing, providing, and/or routing information associated with adaptive electronic messaging based on user interaction, as described elsewhere herein. For example, as illustrated in FIG. 2, the message adaptation system 210 may include a content performance device 215, a content block metric device 220, a content priority device 225, and a content adaptation device 230. In some implementations, the message adaptation system 210 or one or more components of the message adaptation system 210 may include computing hardware used in a cloud computing environment.

The content performance device 215 may include one or more devices capable of receiving, generating, storing, processing, providing, and/or routing information associated with adaptive electronic messaging based on user interaction, as described elsewhere herein. The content performance device 215 may include a communication device and/or a computing device. For example, the content performance device 215 may include a server, such as an application server, a client server, a web server, a database server, a host server, a proxy server, a virtual server (e.g., executing on computing hardware), or a server in a cloud computing system.

The content block metric device 220 may include one or more devices capable of receiving, generating, storing, processing, providing, and/or routing information associated with adaptive electronic messaging based on user interaction, as described elsewhere herein. The content block metric device 220 may include a communication device and/or a computing device. For example, the content block metric device 220 may include a server, such as an application server, a client server, a web server, a database server, a host server, a proxy server, a virtual server (e.g., executing on computing hardware), or a server in a cloud computing system.

The content priority device 225 may include one or more devices capable of receiving, generating, storing, processing, providing, and/or routing information associated with adaptive electronic messaging based on user interaction, as described elsewhere herein. The content priority device 225 may include a communication device and/or a computing device. For example, the content priority device 225 may include a server, such as an application server, a client server, a web server, a database server, a host server, a proxy server, a virtual server (e.g., executing on computing hardware), or a server in a cloud computing system.

The content adaptation device 230 may include one or more devices capable of receiving, generating, storing, processing, providing, and/or routing information associated with adaptive electronic messaging based on user interaction, as described elsewhere herein. The content adaptation device 230 may include a communication device and/or a computing device. For example, the content adaptation device 230 may include a server, such as an application server, a client server, a web server, a database server, a host server, a proxy server, a virtual server (e.g., executing on computing hardware), or a server in a cloud computing system.

The network 235 may include one or more wired and/or wireless networks. For example, the network 235 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 235 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
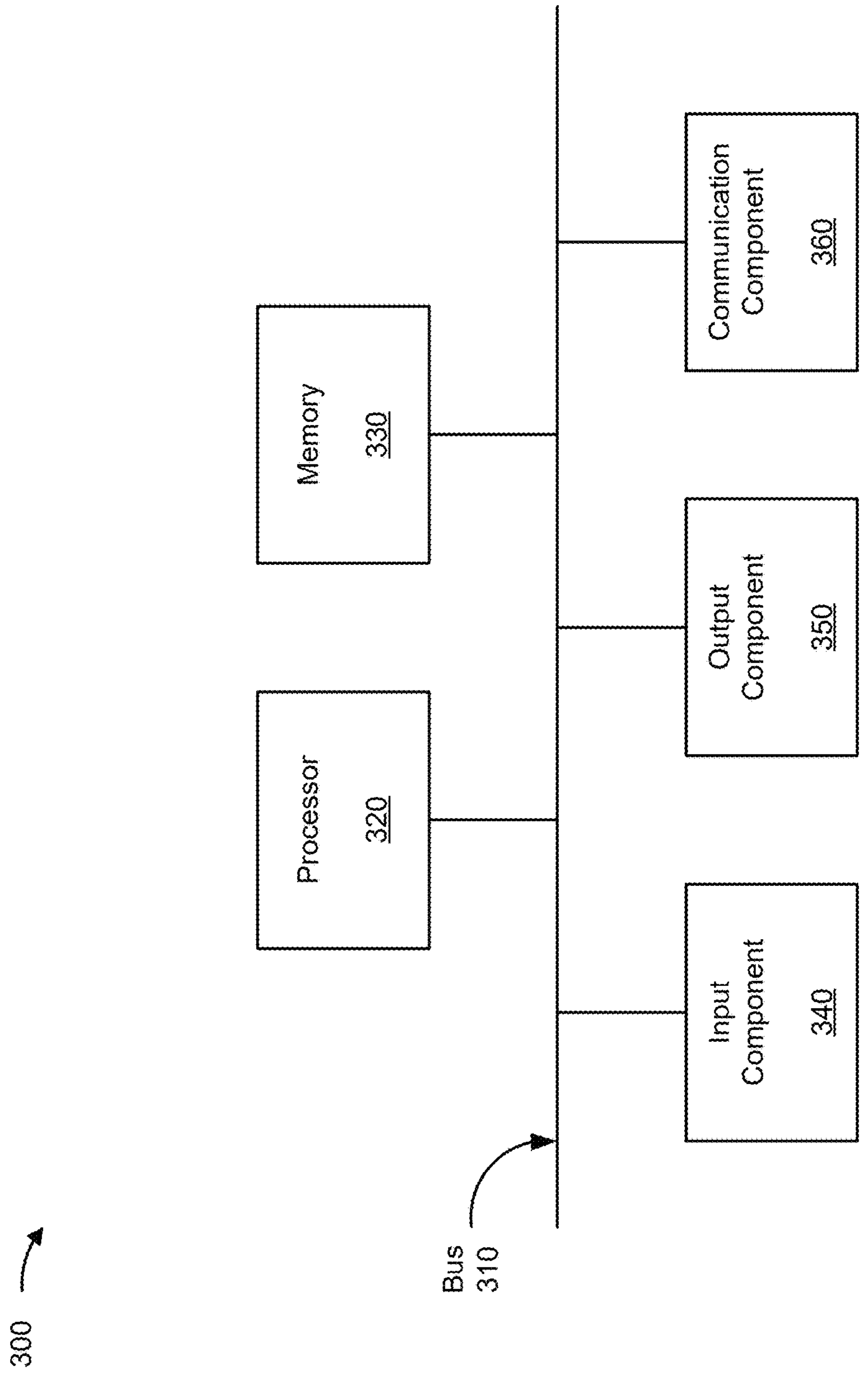
FIG. 3 is a diagram of example components of a device associated with adaptive electronic messaging based on user interaction, in accordance with some embodiments of the present disclosure.

FIG. 3 is a diagram of example components of a device 300 associated with adaptive electronic messaging based on user interaction. The device 300 may correspond to a user device 205, a message adaptation system 210, a content performance device 215, a content block metric device 220, a content priority device 225, and/or a content adaptation device 230. In some implementations, a user device 205, a message adaptation system 210, a content performance device 215, a content block metric device 220, a content priority device 225, and/or a content adaptation device 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
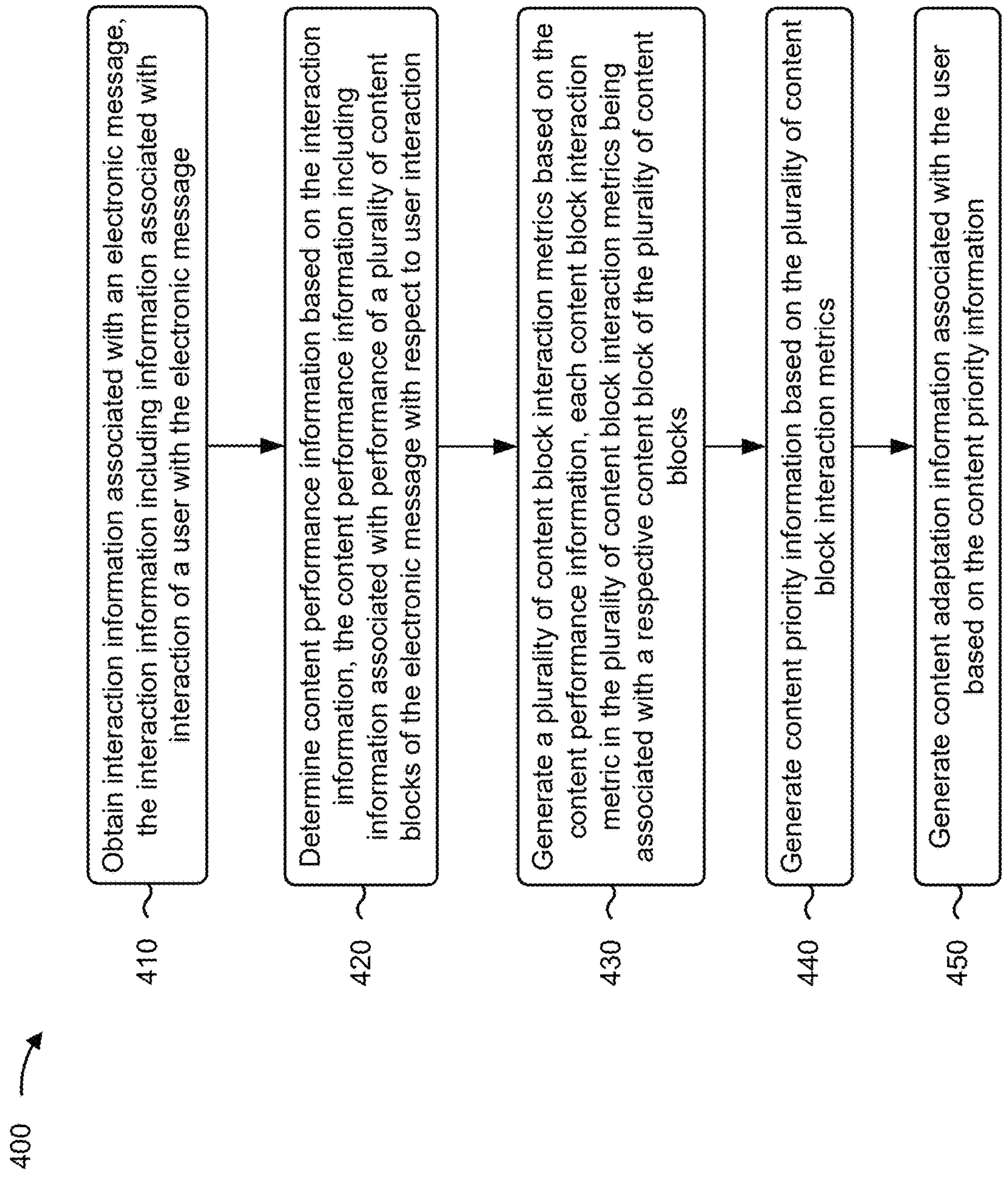
FIG. 4 is a flowchart of an example process associated with adaptive electronic messaging based on user interaction, in accordance with some embodiments of the present disclosure.

FIG. 4 is a flowchart of an example process 400 associated with adaptive electronic messaging based on user interaction. In some implementations, one or more process blocks of FIG. 4 may be performed by the message adaptation system 210. In some implementations, one or more process blocks of FIG. 4 may be performed by one or more devices included in the message adaptation system 210, such as the content performance device 215, the content block metric device 220, the content priority device 225, and/or the content adaptation device 230. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include obtaining interaction information associated with an electronic message, the interaction information including information associated with interaction of a user with the electronic message (block 410). For example, the message adaptation system 210 (e.g., the content performance device 215 using, for example, processor 320 and/or memory 330) may obtain interaction information associated with an electronic message, the interaction information including information associated with interaction of a user with the electronic message, as described above in connection with reference 104 of FIG. 1B. As an example, the message adaptation system 210 may obtain interaction information associated with a first electronic message including a plurality of content blocks including content block 1 displaying content A1, content block 2 displaying content B1, and content block 3 displaying content C1. Here, the interaction information may indicate that content included in content blocks 1 through 3 was provided to display for the user, that the user first interacted with (e.g., clicked on) content C1 in content block 3, and then interacted with content A1 in content block 1.

As further shown in FIG. 4, process 400 may include determining content performance information based on the interaction information, the content performance information including information associated with performance of a plurality of content blocks of the electronic message with respect to user interaction (block 420). For example, the message adaptation system 210 (e.g., the content performance device 215 using, for example, using processor 320 and/or memory 330) may determine content performance information based on the interaction information, the content performance information including information associated with performance of a plurality of content blocks of the electronic message with respect to user interaction, as described above in connection with reference 106 of FIG. 1B. As an example, the message adaptation system 210 may determine content performance information comprising information indicative of performance of content block 1 of the first electronic message (e.g., performance information associated with content A1), information indicative of performance of content block 2 of the first electronic message (e.g., performance information associated with content B1), and information indicative of performance of content block 3 of the first electronic message (e.g., performance information associated with content C1).

As further shown in FIG. 4, process 400 may include generating a plurality of content block interaction metrics based on the content performance information, each content block interaction metric in the plurality of content block interaction metrics being associated with a respective content block of the plurality of content blocks (block 430). For example, the message adaptation system 210 (e.g., the content block metric device 220 using, for example, using processor 320 and/or memory 330) may generate a plurality of content block interaction metrics based on the content performance information, each content block interaction metric in the plurality of content block interaction metrics being associated with a respective content block of the plurality of content blocks, as described above in connection with reference 110 of FIG. 1B. As an example, the message adaptation system 210 may generate a plurality of content block interaction metrics including a content block interaction metric of 60 for content block 1 of the first electronic message, a content block interaction metric of 15 for content block 2 of the first electronic message, and a content block interaction metric of 95 for content block 3 of the first electronic message.

As further shown in FIG. 4, process 400 may include generating content priority information based on the plurality of content block interaction metrics (block 440). For example, the message adaptation system 210 (e.g., the content priority device 225 using, for example, using processor 320 and/or memory 330) may generate content priority information based on the plurality of content block interaction metrics, as described above in connection with reference 114 of FIG. 1B. As an example, the message adaptation system 210 may generate content priority information indicating that content related to the content provided in content block 1 of the first electronic message is medium priority content, that content related to the content provided in content block 2 of the first electronic message is low priority content, and that content related to the content provided in content block 3 of the first electronic message is high priority content.

As further shown in FIG. 4, process 400 may include generating content adaptation information associated with the user based on the content priority information (block 450). For example, the message adaptation system 210 (e.g., the content adaptation device 230 using, for example, using processor 320 and/or memory 330) may generate content adaptation information associated with the user based on the content priority information, as described above in connection with reference 118 of FIG. 1B. As an example, the message adaptation system 210 may generate content adaptation information that indicates that content to be included in another electronic message provided for display to the user is to include content C1 (e.g., the content that was displayed in content block 3 in the first electronic message) in content block 1, content C2 (e.g., content related to the content that was displayed in content block 3 in the first electronic message) in content block 2, and content B2 (e.g., content related to the content that was displayed in content block 2 in the first electronic message).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1C. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for electronic message adaptation, the system comprising:
- one or more memories; and
- one or more processors, communicatively coupled to the one or more memories, configured to:
  - obtain interaction information associated with a first electronic message, the interaction information being associated with interaction of a user with the first electronic message;
  - determine, based on the interaction information, content performance information associated with a plurality of content blocks of the first electronic message;
  - generate a plurality of content block interaction metrics based on the content performance information, each content block interaction metric in the plurality of content block interaction metrics being associated with a respective content block of the plurality of content blocks;

generate content priority information based on the plurality of content block interaction metrics;

generate content adaptation information associated with the user based on the content priority information, wherein the content adaptation information indicates one or more modifications to be applied to one or more of the plurality of content blocks of the first electronic message; and cause a second electronic message for the user to be generated based on the content adaptation information, wherein the second electronic message includes at least a subset of the plurality of content blocks of the first electronic message and incorporates the one or more modifications.

2. The system of claim 1, wherein the content adaptation information is provided to cause the first electronic message to be modified based on the content adaptation information, and the first electronic message, as displayed to the user upon reopening, incorporates the one or more modifications.

3. The system of claim 1, wherein the one or more processors, to generate the content priority information, are configured to:

identify a content block for which a content block interaction metric satisfies a threshold; and generate the content priority information to include an indication that content related to the identified content block is high priority content.

4. The system of claim 1, wherein the one or more processors, to generate the content priority information, are configured to:

identify a content block for which a content block interaction metric fails to satisfy a threshold; and generate the content priority information to include an indication that content related to the identified content block is low priority content.

5. The system of claim 1, wherein the content adaptation information includes an indication that content associated with a particular content block of the plurality of content blocks is not to be included in the second electronic message.

6. The system of claim 1, wherein the content adaptation information includes an indication that additional content related to content associated with a particular content block of the plurality of content blocks is to be included in the second electronic message.

7. The system of claim 1, wherein the content adaptation information includes an indication that content associated with two or more content blocks of the plurality of content blocks is to be reordered in the second electronic message.

8. The system of claim 1, wherein the one or more processors are further configured to:

obtain second interaction information associated with the second electronic message;

determine, based on the second interaction information, second content performance information associated with a plurality of content blocks of the second electronic message;

generate a second plurality of content block interaction metrics based on the second content performance information;

generate second content priority information based on the second plurality of content block interaction metrics; and update the content adaptation information associated with the user based on the second content priority information.

9. A method for electronic message adaptation, comprising:

obtaining, by a system, interaction information associated with an electronic message, the interaction information including information associated with interaction of a user with the electronic message;

determining, by the system, content performance information based on the interaction information, the content performance information including information associated with performance of a plurality of content blocks of the electronic message with respect to user interaction;

generating, by the system, a plurality of content block interaction metrics based on the content performance information, each content block interaction metric in the plurality of content block interaction metrics being associated with a respective content block of the plurality of content blocks;

generating, by the system, content priority information based on the plurality of content block interaction metrics;

generating, by the system, content adaptation information associated with the user based on the content priority information, wherein the content adaptation information indicates one or more modifications to be applied to one or more of the plurality of content blocks of the electronic message; and causing, by the system, (i) the electronic message, as displayed to the user upon reopening, to incorporate the one or more modifications, or (ii) another electronic message to be generated, the other electronic message including at least a subset of the plurality of content blocks of the electronic message and incorporating the one or more modifications.

10. The method of claim 9, wherein generating the content priority information comprises:

determining whether a content block interaction metric associated with a content block satisfies a threshold; and generating the content priority information to include an indication of a priority of content related to the content block based on whether the content block interaction metric satisfies the threshold.

11. The method of claim 9, wherein the content adaptation information includes an indication of whether content associated with a particular content block of the plurality of content blocks is to be included in another electronic message to be provided to the user.

12. The method of claim 9, wherein the content adaptation information includes information associated with reordering content associated with two or more content blocks of the plurality of content blocks in another electronic message to be provided to the user.

13. The method of claim 9, further comprising:

obtaining second interaction information associated with a second electronic message provided to the user;

determining, based on the second interaction information, second content performance information associated with a plurality of content blocks of the second electronic message;

generating a second plurality of content block interaction metrics based on the second content performance information;

generating second content priority information based on the second plurality of content block interaction metrics; and updating the content adaptation information associated with the user based on the second content priority information.

14. The method of claim 9, wherein a content block of the plurality of content blocks includes at least one of: a link, an image, text, or a user interface element.

15. The method of claim 9, wherein the interaction information includes information indicating a location of an interaction with the electronic message.

16. A non-transitory computer-readable medium storing a set of instructions, the set of instructions comprising:

one or more instructions that, when executed by one or more processors of a system, cause the system to:

obtain interaction information associated with a first electronic message provided to a user;

determine, based on the interaction information, content performance information associated with a plurality of content blocks of the first electronic message;

generate content priority information based on a plurality of content block interaction metrics generated based on the content performance information;

generate or update content adaptation information associated with the user based on the content priority information, wherein the content adaptation information indicates one or more modifications to be applied to one or more of the plurality of content blocks of the first electronic message; and provide the content adaptation information in association with (i) modifying the first electronic message, as displayed to the user upon reopening, to incorporate the one or more modifications, or (ii) generating a second electronic message associated with the user, the second electronic message including at least a subset of the plurality of content blocks of the first electronic message and incorporating the one or more modifications.

17. The non-transitory computer-readable medium of claim 16, wherein the one or more instructions, that cause the system to generate the content priority information, cause the system to generate the content priority information based on a determination of whether a content block interaction metric associated with a content block from the plurality of content blocks satisfies a threshold.

18. The non-transitory computer-readable medium of claim 16, wherein the content adaptation information includes an indication of whether content associated with a particular content block of the plurality of content blocks is to be removed from the first electronic message or omitted from the second electronic message.

19. The non-transitory computer-readable medium of claim 16, wherein the content adaptation information includes an indication that content associated with two or more content blocks of the plurality of content blocks is to be reordered in the first electronic message or in the second electronic message.

20. The non-transitory computer-readable medium of claim 16, wherein the one or more instructions further cause the system to:

obtain second interaction information associated with the second electronic message;

determine, based on the second interaction information, second content performance information associated with a plurality of content blocks of the second electronic message;

generate second content priority information based on a second plurality of content block interaction metrics generated based on the second content performance information; and update the content adaptation information associated with the user based on the second content priority information; and provide the updated content adaptation information in association with modifying the first electronic message, modifying the second electronic message, or generating a third electronic message associated with the user.

* * * * *